United States Patent
Jeansonne et al.

(10) Patent No.: US 7,353,416 B2
(45) Date of Patent: Apr. 1, 2008

(54) WIRELESS ACCESS POINT SEEK MODE FOR WIRELESS ACCESS CLIENTS

(75) Inventors: Jeffrey K. Jeansonne, Houston, TX (US); Tim L. Zhang, Spring, TX (US); James L. Mondshine, Cypress, TX (US); Jeffrey C. Parker, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1117 days.

(21) Appl. No.: 09/912,784

(22) Filed: Jul. 25, 2001

(65) Prior Publication Data

US 2003/0023761 A1 Jan. 30, 2003

(51) Int. Cl.
*G06F 1/32* (2006.01)
*G06F 1/00* (2006.01)

(52) U.S. Cl. .................. 713/324; 713/310; 455/39

(58) Field of Classification Search ............... 445/574; 707/535; 709/217, 224, 227; 701/213; 342/357.06
See application file for complete search history.

(56) References Cited

U.S. PATENT DOCUMENTS

| | | | | |
|---|---|---|---|---|
| 4,194,833 A | * | 3/1980 | Lester et al. ................... | 399/4 |
| 4,409,687 A | * | 10/1983 | Berti et al. ...................... | 455/7 |
| 5,826,015 A | * | 10/1998 | Schmidt ...................... | 713/201 |
| 5,991,287 A | * | 11/1999 | Diepstraten et al. ......... | 370/338 |
| 6,002,918 A | * | 12/1999 | Heiman et al. ............. | 340/7.38 |
| 6,388,773 B1 | * | 5/2002 | Smith et al. ................ | 358/473 |
| 6,448,927 B1 | * | 9/2002 | Ishigaki et al. ......... | 342/357.06 |
| 6,473,811 B1 | * | 10/2002 | Onsen .......................... | 710/15 |
| 6,487,425 B1 | * | 11/2002 | Thakker et al. ............. | 455/574 |
| 6,580,700 B1 | * | 6/2003 | Pinard et al. ............... | 370/332 |
| 6,707,842 B2 | * | 3/2004 | Rick et al. .................. | 375/142 |
| 2001/0031626 A1 | * | 10/2001 | Lindskog et al. .......... | 455/67.3 |
| 2002/0054158 A1 | * | 5/2002 | Asami ......................... | 345/838 |
| 2002/0069231 A1 | * | 6/2002 | Ichikawa .................... | 707/535 |
| 2002/0142746 A1 | * | 10/2002 | Li et al. ..................... | 455/307 |

OTHER PUBLICATIONS

"Grasshopper Manual", 2000.*
"7-inch AC/DC black and white television" RCA 1999.*
"Sporty's JD-200 Transceiver Operator's Manual", 1999.*
"ECO treck 2, family radio service 2-way radio", 2001.*

* cited by examiner

Primary Examiner—Andrew Caldwell
Assistant Examiner—Julian Chang (57) ABSTRACT

A computer system that is configured to wirelessly access a local area network is further configured to search for the availability of wireless access points when the notebook computer is powered-off. A computer user activates this powered-off seek mode by pressing a button mounted on the outside cover of the computer. Activation of this button then activates a power supply within the notebook computer that powers a wireless communication module. The remaining power supplies in the computer system, however, are not turned on. Once the wireless communication or radio module is powered, a side-band signal to the normal universal serial bus communication activates the wireless access seek mode. Once a determination is made by the wireless communication module, that determination is passed to the user in the form of a light emitting diode which indicates the availability or nonavailability of a wireless access point in range.

28 Claims, 2 Drawing Sheets

WIRELESS ACCESS POINT SEEK MODE FOR WIRELESS ACCESS CLIENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to notebook and other generally portable computing devices. More particularly, the present invention relates to using wireless access to local area networks and the Internet for these computing devices. More particularly still, the present invention relates to a powered-off seek mode for notebook computers with wireless access capability.

2. Background of the Invention

Both in homes and in offices, a standard feature for computer system users is a bundle of wires connected to the computer. This bundle of wires may contain power cables, a mouse cable, a keyboard cable, a parallel cable for an attached printer, audio cables, and a phone line or network cable. The trend in the industry has been to alleviate these cables, and the network cable, whatever its form, is no different.

Computer users, both consumer and industrial, may currently purchase wireless local area network (LAN) devices. These devices usually include a base station radio unit coupled by the standard wires or cables to a LAN and/or internet connection, as well as smaller radio unit coupled to the computer user's system. Wireless access to the LAN or internet, or both, takes place in the standard fashion, except data communications travel between the remote unit and the base station via radio frequency signals. There are several protocols or standards for this wireless communication, such as Institute of Electronic and Electrical Engineers (IEEE) 802.11A, IEEE 802.11(B), and Bluetooth, to name a few.

When using these wireless access points in known locations, e.g., in your home, the fact that a wireless access point is available is simply a given. Likewise, many corporations have implemented wireless access so that company computer users may carry their laptops to many different locations throughout the company facilities. Software routines enable the wireless access computer user to scan the available wireless access points and choose the best available point based on any number of criteria, that may include signal strength and available bandwidth on the particular base station.

Unfortunately, in the prior art, scanning for available wireless access points requires the notebook computer to be powered-on, booted-up and fully operational. It becomes inconvenient for a user who is trying to find a wireless access point in an unknown location, e.g., within an airport or other crowded location, to boot the notebook computer at every possible location to check for wireless access availability. Likewise, carrying the powered-on and open notebook from location to location, and running software routines at each location to check for available access, is not a satisfactory solution. Not only is this method physically inconvenient, but also such a method consumes battery power, which in many circumstances is a precious commodity.

Thus, what is needed in the art is a mechanism and method for a notebook computer with wireless access capability to check for available wireless access points without the need of opening, powering-on, booting and starting particular software on the notebook computer.

BRIEF SUMMARY OF THE INVENTION

The problems noted above are solved in large part by a system and method that allows the wireless communication module (the device that performs the wireless communication and that is programmed to perform the seek function mentioned above) to perform a seek function without the need of powering-on the attached notebook computer or other portable computing device. More particularly, the wireless communication module attached to the host notebook computer preferably has the electronics required to perform radio frequency communications (the wireless access service), and also preferably has a microcontroller that acts as an interface between the radio components and the host notebook computer. This microcontroller has firmware programs that when executed perform the seek function.

However, initiating this seek function is normally done by communicating signals across a serial bus, preferably a Universal Serial Bus. In the situation contemplated by the preferred embodiments of this invention, the host notebook computer is preferably powered-off, and thus initiating the seek mode of the wireless communication module across the serial port is not possible. To address this short coming, the preferred embodiments implement a side-band signal to the Universal Serial Bus connection. This side-band signal is preferably a digital signal connected to an available digital input signal of the wireless communication module. Firmware of the wireless communication module is preferably modified such that upon receipt of the signal requesting a seek mode, a standard scan is performed. Given that the host notebook computer is preferably powered-off during the seek mode, some mechanism must be in place to inform the user whether wireless access is available.

The preferred embodiments also comprise a notification device on the notebook computer or wireless communication module, if this module is in a visible location on the notebook. This signaling apparatus could be as simple as a single light emitting diode (LED), or as complex as an LCD display that can pass text messages to the notebook user.

Because the preferred embodiments perform wireless access seeking while the notebook computer is powered-off, the preferred embodiments also provide a seek logic within the notebook computer that has the capability of enabling power to the wireless communication module during the seek mode, and activating the seek request side-band signal. Providing power to the wireless communication module is preferably accomplished by enabling the power supply that feeds the wireless communication module.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The terms portable computer, notebook, and laptop refer generally to any computer or computer system that is portable and may be operated on battery power. Although the term notebook is used throughout this specification, it must be understood that term could be used interchangeably with the terms laptop and portable computer. Further, the structures and methods described are equally applicable to other portable computing devices, e.g., hand held organizers and the like. Thus, the following description, though referring to notebook computers, applies equally to these other portable devices using wireless access.

The terms "powered-on" and "powered-off" are used throughout this specification. The term "powered-on" means that the computer system is on and may be operated by a computer system user. The term "powered-off" means that the computer system is off and is not operational as far as a computer system user is concerned. It should be noted that in most notebook computers, even when the notebook computer is powered-off, there are certain functions and circuits within the computer that are still coupled to active power, e.g., a keyboard controller looking for assertion of a power-on request. It is intended throughout this specification that the term "powered-off" refers to the condition that, as far as the computer system user is concerned, the device is not operational. Likewise, it is intended that the term "powered-on" refers to the notebook computer in its operational state. No distinction should be made in the powered-off mode regarding the powering of a limited number of devices within the notebook computer when it is otherwise not operational. These conditions or states of the notebook computer could alternatively be referred to as turned on, turned off, powered up, powered down, and the like.

DETAILED DESCRIPTION OF THE PREFERRED EMBODIMENTS

Figure 1:
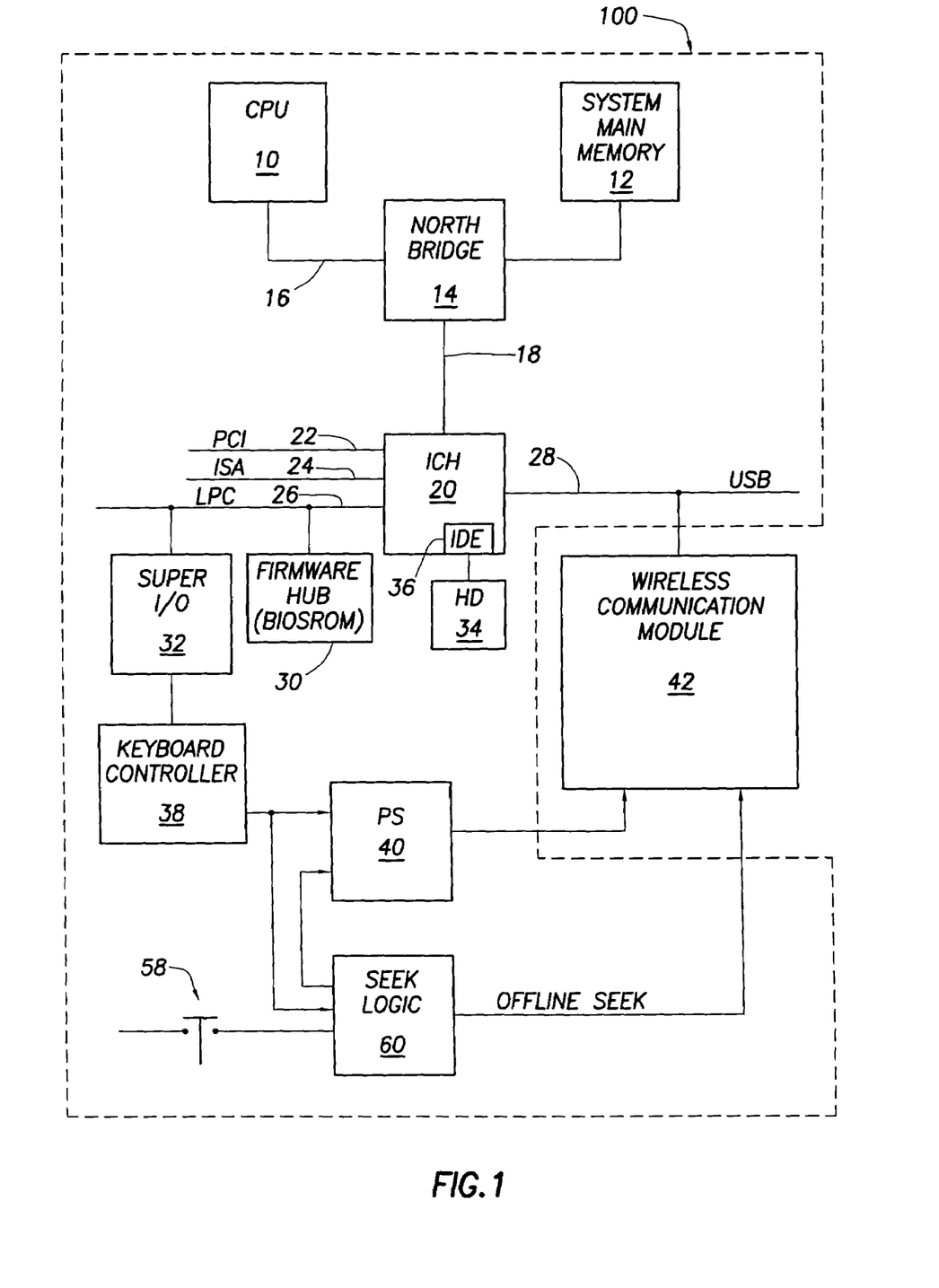
FIG. 1 shows an electrical block diagram of an embodiment of a notebook computer.

Referring now to FIG. 1, notebook computer system 100, in accordance with the preferred embodiment comprises a microprocessor or CPU 10 coupled to a main memory array 12 through an integrated bridge logic device 14. As depicted in FIG. 1, the bridge logic device 14 is sometimes referred to as a "North bridge," based generally upon its location within the computer system drawing. The CPU 10 preferably couples to the bridge logic 14 via a CPU bus 16, or the bridge logic 14 may be integrated into the CPU 10. The CPU 10 preferably comprises a Pentium III® microprocessor manufactured by Intel®. It should be understood, however, that other alternative types and brands of microprocessors could be employed. The main memory array 12 preferably couples to the bridge logic unit 14 through a memory bus 18, and the bridge logic 14 preferably includes a memory control unit (not shown) that controls transactions to the main memory by asserting the necessary control signals during memory accesses. The main memory array 12 may comprise any suitable type of memory such as dynamic random access memory (DRAM), any of the various types of DRAM devices such as synchronous DRAM (SDRAM), or memory devices that may become available in the future.

The North bridge 14 bridges various buses so that data may flow from bus to bus, even though these buses may have varying protocols. In the computer system of FIG. 1, the North bridge 14 couples to the primary expansion bus 18, which in the preferred embodiment is a Hublink communication bus, a proprietary system of Intel Corporation.

The preferred embodiment of notebook 100 further includes a second bridge logic device, known in the art as Input/Output Controller Hub (ICH) 20. The ICH 20 couples or bridges the primary expansion bus 18 to secondary expansion buses. These secondary expansion buses may include a peripheral components interconnect (PCI) bus 22, industry standard architecture (ISA) bus 24, a low pin count (LPC) bus 26, a sub-ISA bus (not shown), a universal serial bus 28, and/or any of a variety of other buses that are available or may become available in the future. In the embodiment shown in FIG. 1, the ICH 20 bridges basic input/output system (BIOS) read-only memory (ROM) 30 (also known as a firmware hub) to the primary expansion bus 18, therefore programs contained in the BIOS ROM 30 are accessible to the CPU 10. Also attached to the LPC bus 26 is a Super Input/Output (Super I/O) controller 32, which controls many system functions, including standard serial and parallel ports (not shown). The Super I/O 32 is often referred to as "Super" because of the many I/O functions it may perform.

The BIOS ROM 30 preferably contains firmware embedded on ROM memory chip and performs a number of low-level functions. For example, the BIOS executes the power on self-test (POST) during system initialization (Boot-Up). The POST routines test various sub-systems in the computer system, isolate faults and report problems to the user. The BIOS is also responsible for loading the operating system into the computer's main system memory. Further, the BIOS handles low-level input/output transactions to the various peripheral devices such as the hard drive 34 coupled to an IDE controller 36 of the ICH 20.

Referring still to FIG. 1, the notebook computer of the preferred embodiment also include a keyboard controller 38. As the name implies the keyboard controller 38 interfaces with the integrated keyboard of the notebook computer (not shown). Also the keyboard controller provides many other functions, including control of notebook computer heat control components (e.g., a system fan (not shown)), and power-up sequencing of the many power supplies in the notebook computer (some not shown). In particular, the keyboard controller is partially responsible for commanding the power supply 40, which supplies the wireless communication module 42 (discussed more fully below), to power up the appropriate rail.

Still referring to FIG. 1, the preferred embodiment also contains a radio module or wireless communication module 42. The wireless communication module 42 is preferably configured in such a way as to allow the notebook computer 100 to access a network. This network could be a local area network (LAN), a wide area network (WAN), or any other suitable network now known or developed in the future. This access to the network may include access to the Internet. The wireless communication module 42 preferably couples to the notebook computer 100 by way of the Universal Serial Bus 28. The dashed line in FIG. 1 merely exemplifies that in the preferred embodiment, the wireless communication module 42 is external notebook computer 100 proper. The wireless communication module 42 could be mounted at any suitable location, e.g., on the outside cover of the notebook's folding screen. However, as wireless access becomes more popular, the wireless communication module may be integrated onto one of the electronics boards in the notebook, possibly the motherboard. In such an implementation, a small antenna would need to protrude from some location to facilitate radio communications.

Figure 2:
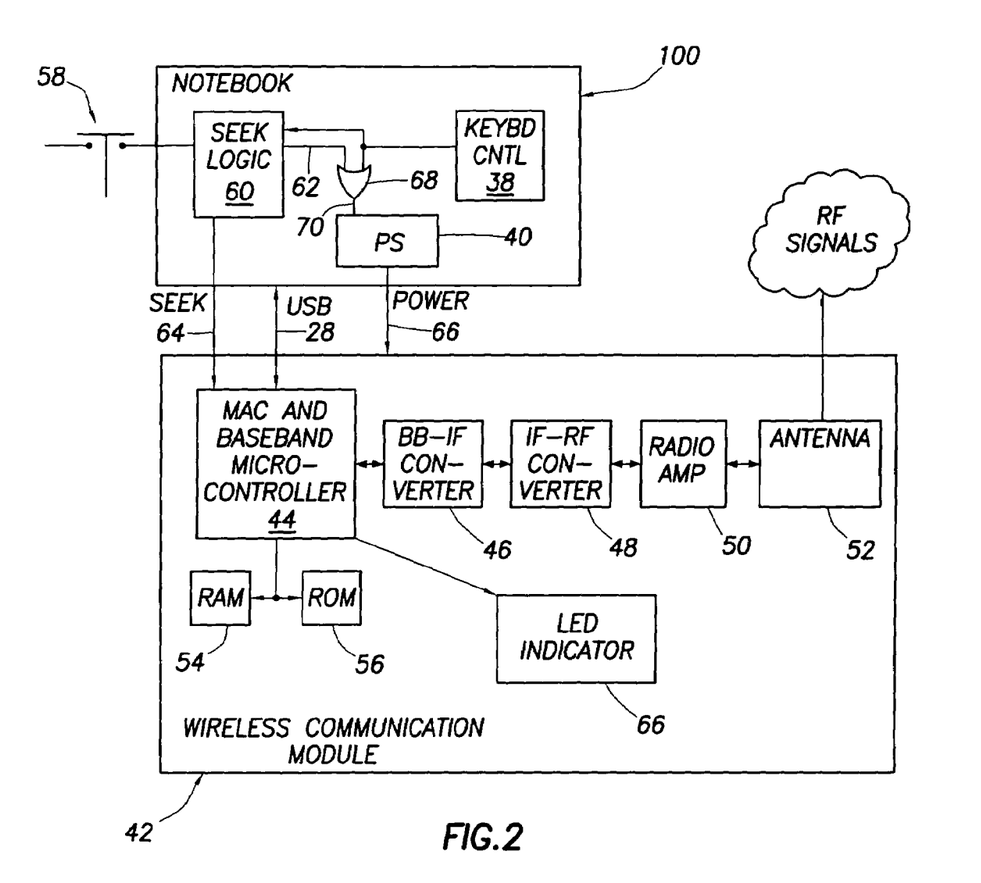
FIG. 2 shows a more detailed electrical block diagram of a wireless communication module coupled to a notebook computer.

Referring now to FIG. 2, there is shown in greater detail the electrical signals exchanged between the wireless communication module 42 and the notebook 100. In the preferred embodiments, the wireless communication module 42 implements a data communication protocol standardized as IEEE 802.11B. This standard is an 11 megabits per second (Mbps) data communication protocol operating in a range of frequencies at or near 2.4 Giga-Hertz. The IEEE 802.11B standard uses one of a direct sequence spread spectrum data communication or a frequency hopping spread spectrum system. The protocol sets power levels for transmission such that wireless access is available over a relatively small area, e.g., single home or small office complex. Not only does this standard allow for wireless access to the LAN, but the standard itself also implements a wireless LAN system. That is, two or more devices configured to communicate with a base station may also communicate with each other in a LAN-style network, using the base station device.

Referring still to FIG. 2, the wireless communication module 42 preferably comprises a media access controller (MAC) 44. As indicated in FIG. 2, the media access controller 44 interfaces with the notebook computer 100 by way of a universal serial bus 28. It is across this universal serial bus 28 that data communications flow in the normal operating procedure. More specifically, the media access controller 44 preferably receives data communications from the notebook computer 100 across the universal serial bus 28, converts the data as necessary under the protocol implemented, and passes the converted data along to the radio frequency components.

In the preferred embodiments, the media access controller 44 is preferably a microcontroller. As one of ordinary skill in the art is aware, a microcontroller is an integrated circuit device that has the ability to execute programs, has a series of digital inputs, digital outputs, and may also have at least one digital to analog converter. The media access controller could be as complicated as a full-blown microprocessor (with the necessary supporting circuits such as memory buses, memory controllers, and random access memory), or could be as simple as a hard-wired circuit for implementing the particular protocol. In the preferred embodiments, this protocol is IEEE 802.11B; however, other protocols may be implemented, e.g., IEEE 802.11A or Bluetooth. Thus, the media access controller 44 does any necessary protocol conversion with data coming from the notebook computer 100, and passes that data to the radio frequency circuits or components.

In the preferred embodiment, the radio frequency components comprise a base band to intermediate frequency (BB-IF) converter 46, an intermediate frequency to radio frequency (IF-RF) converter 48, a radio amplifier 50 and antenna 52 (FIG. 2). The data communications are translated into a series of radio frequency signals that are transmitted to a base station type unit (not shown).

In similar fashion, data communications coming from the base station are transmitted to the notebook computer over these radio frequencies. The signals received by the receiving antenna 52 couple through the remaining radio frequency components 46, 48 and 50 to the media access controller 44, where again protocol conversion takes place. The information is transferred to the notebook computer over the universal serial bus 28.

Given that the media access controller 44 of the preferred embodiments is a microcontroller, this controller may have onboard RAM and ROM (not shown), but also preferably has external RAM 54 and ROM 56. Preferably, the ROM 56 holds software programs configured to implement the protocol conversion required between the wireless communication and the universal serial bus protocol. The media access controller 44 preferably executes those programs stored in the ROM 45 using the RAM 54 as program work space.

In addition to being able to convert between universal serial bus protocol and the protocol for wireless communications, the media access controller 44 also is programmed to have the ability to seek or scan for available wireless access points. More particularly, the microcontroller preferably has available to it a series of software routines that control the radio frequency components in such a way as to be able to seek out or scan for available wireless access points. In some locations, there may be multiple wireless access points available, and the media access controller 44 actively or passively searches for those wireless access points, transfers that information to the computer system user over the universal serial bus 28, and thus allows the user to select a particular wireless access point. In normal operation, when the notebook computer 100 is powered-on, a user may initiate this scan or seek process over the universal serial bus 28.

Seeking for the availability of wireless access points may take at least two forms: an active mode and a passive mode. In a passive scan the wireless communication module 42, using the media access controller 44 and the various radio components 46, 48, 50 and 52, merely listens in specific frequency channels for periodically transmitted beacon signals from the wireless access point base station. By simply listening for these beacon signals, the wireless communication module determines the availability of wireless access points. In the second seek mode, the active mode, the wireless communication module preferably transmits signals on each of the possible assigned channels for the particular protocol in an effort to actively seek out available wireless access points. Because of the rate at which the beacon signals are transmitted by a wireless access point base station, seeking a wireless access point using the passive mode may be somewhat slower than the active mode; however, each of these searches span a time of 10 seconds or less.

The discussion to this point has focused on operation of the wireless communication module 42 in relation to the notebook computer 100 when that notebook computer 100 is powered-on. However, the preferred embodiments add additional components and functionality to both the notebook computer 100 and the wireless communication module 42 such that seeking for the availability of wireless access points may be accomplished while the notebook computer is powered-off. The preferred embodiments give the computer system user the ability to initiate a seek while the notebook computer is powered-off and the display screen is in a closed position, as may be the case if the notebook computer is in a carrying case or being transferred from one location to another.

Figure 3:
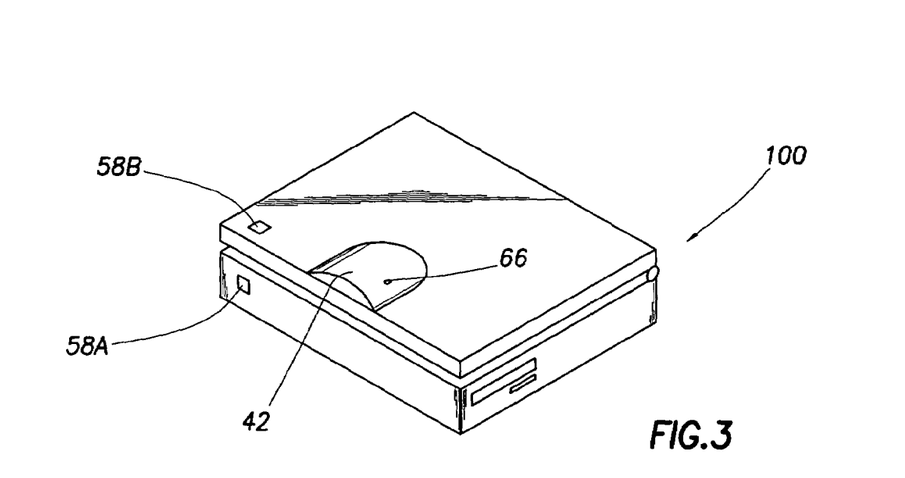
FIG. 3 shows a perspective view of a notebook computer of an embodiment.

More particular, and referring to FIG. 3, there is preferably a means for activating the seek routines of the wireless communication module. Because the envisioned use of the structures and related method is with the computer powered-off and in the closed position, the means for activating the seek command is preferably an electrical switch 58 mounted on some outer surface of the notebook computer 100. While the mounting location for the electrical switch 58 could be almost anywhere on the outer surface of the notebook 100, it is preferred that this electrical switch be either mounted on the front surface of the notebook (switch 58A of FIG. 3), or on top of the display screen in the closed position (58B of FIG. 3). The electrical switch could take many forms. In the preferred embodiment, the electrical switch is merely a momentary push-button which is pressed and released by the user. However, the electrical switch could be a momentary toggle switch, an electrical switch that requires one push to activate, and a second push to deactivate, or could be as complex as a capacitive sensor or some form of key operated device. Regardless of the form, the means for activating the seek mode merely asserts a signal that begins the process of seeking for wireless access points when the computer is powered-off.

Referring again to FIG. 1, the electrical switch 58 preferably couples to a control logic means, which in the preferred embodiment is a control or seek logic 60. The seek logic 60 is preferably a hardwired series of logic gates that selectively initiate a seek function of the wireless communication module 42, and selectively activates a power supply 40 that supplies the wireless communication module 42.

As discussed, the envisioned use of the structures and related method are to perform seeks for wireless access points when the computer system 100 is powered-off. In order for the wireless communication module 42, which is itself a means for wireless network access, to perform its seek function, it must have power. Therefore, the seek logic 60 preferably activates power supply 40 responsive to assertion of the electrical switch 58. More particularly, the seek logic 60 preferably has a power supply enable digital output signal 62 that couples to an enable digital input signal 70 of the power supply 40. When this power supply enable digital output signal 62 is asserted, the power supply preferably powers an output rail 66 which supplies the wireless communication module 42. In the preferred embodiments, the power supply 40 that supplies the wireless communication 42 when the notebook computer is powered-off is the same power supply that supplies that module 42 when the notebook computer is powered-on. Thus, FIG. 2 indicates that the keyboard controller 38 also couples to the enable signal 70 of the power supply 40. In the embodiment shown in FIG. 2, the simultaneous coupling of the enable signal 66 of the power supply 40 to the seek logic 60 and the keyboard controller 38 is done through a logical OR gate 68. Use of the OR gate 68 in this manner to couple the seek logic 60 and the keyboard controller 38 to the power supply 40 is only exemplary of allowing both of those devices to control the power supply 40.

As discussed above, the media access controller 44 has the ability to perform the seek function as initiated by transfer of commands across the universal serial bus 28. In the situation though where the notebook computer 100 is powered-off, communications in the normal fashion (across the methods universal serial bus 28) simply cannot occur. Therefore, in the preferred embodiments, there exists a separate or side-band digital signal 64 coupling the seek logic 60 and the media access controller 44. Preferably, it is this digital signal 64 that the seek logic 60 uses to command the media access controller 44 to perform the seek function when the notebook computer 100 is powered-off.

Once the wireless communication module 42 has power from the power supply 40, and receives a seek command across the digital seek line 64, the media access controller 44, in combination with the balance of the radio frequency components, performs either an active or preferably a passive seek for available wireless access points. Because the notebook computer 100 in the envisioned operation is powered-off, the media access controller 44 must have some means for notifying the computer system user of the availability of wireless access points.

In the preferred embodiments, the notification device comprises an LED indicator 66 (FIGS. 2 and 3). If the media access controller 44 determines that a wireless access point is available, then preferably the media access controller illuminates the LED 66 as an indication to the computer system user that a wireless access point is available. To limit the number of connections, or side-band signals between the wireless communication module 42 and the notebook 100, in the preferred embodiments the LED indicator 66 is preferably placed on an outer surface of the wireless communication module 42. FIG. 3 shows one embodiment of a wireless communication module 42 mounted on a closed front cover of the notebook computer 100. FIG. 3 shows the LED 66 mounted in such a location as to be visible to the computer system user who is performing the wireless access seek function. Because of the simplicity of the design, the LED indicator 66 is the preferred embodiment. However, the notification means could also include a plurality of light emitting diodes arranged in such a way as to communicate the availability, and possibly the unavailability, of a wireless access point. Indeed, the notification means could also include some form of liquid crystal display across which text messages may be displayed. Further, the location of the notification means need not be limited to an outer cover of the wireless communication module.

In operation, it is preferred that the notebook computer 100 be powered-off and the display screen closed, as shown in FIG. 3. Preferably, the user activates the momentary push-button switch 58 and then immediately releases that button. Based on the activation of the push-button switch, the seek logic 60 preferably initiates a wireless access point seek mode of the media access controller. It is preferred then that the seek logic 60 enables the power supply 40 for a sufficient amount of time for the wireless communication module 42 to perform its seek function. Alternatively, the seek logic could be configured such that enabling of the power supply only takes place while the momentary push-button 58 is in the actuated position. In this alternative embodiment, the user would be required to hold the seek activation button 58 for a sufficient amount of time to perform the seek (10 seconds or less), and is therefore not the preferred implementation.

Once the seek logic 60 receives a signal indicating the assertion of the momentary push-button 58, the seek logic preferably then enables the power supply 40 by asserting its power supply enable digital output signal 62. Either simultaneously with asserting the power supply enable signal 62, or sometime soon thereafter, the seek logic 60 preferably asserts the seek signal 64 coupled to the media access controller 44. Because in normal operation (that is, with the notebook computer powered-on) the seek function of the media access controller may be activated by communication across the universal serial bus 28, it is preferred that the seek logic 60 be configured such that if the notebook computer is powered-on and the momentary push-button 58 is activated, the seek logic 60 refrains from asserting the seek signal 64. The seek logic 60 may make a determination as to whether the notebook computer 100 is powered-on using several different mechanisms; however, FIG. 2 shows the seek logic 60 receiving the power supply enable signal from the keyboard controller 38 as an indication that the computer system is powered-on.

After receiving power from the power supply 40 and receiving the seek request by means of assertion of the seek signal 64, the wireless communication module 42 preferably executes its seek function. In a preferred embodiment, execution of the seek function involves the execution of software programs by the microcontroller 44. Execution of this program preferably utilizes the radio frequency components 46, 48. 80 and 52 as necessary to perform the seek function. This is preferably the passive scanning as discussed above. When the wireless communication module 42 performs this seeking or scanning when the notebook computer is operational, the results of that seek or scan are transferred across the universal serial bus 28. Using the wireless communication module 42 to seek for wireless access points when the notebook computer 100 is powered-off, however, precludes the transmitting of the results in this manner. Thus, the preferred embodiments inform the computer system user of the availability, and/or unavailability, of a wireless access point by use of a light emitting diode indicator 66. If wireless access points are available, the media access controller 44 preferably asserts a signal which lights the light emitting diode 66.

After a sufficient amount of time to allow the wireless communication module 42 to perform its seek function, preferably the seek logic 60 then disables the power supply 40 which then effectively turns off the wireless communication module 42 and the system is again ready for another activation of the momentary push-button switch 58.

The preferred embodiments described above are directed to determining the availability of wireless access points using a computer system and its associated wireless communication module. These are the preferred embodiments inasmuch as computer system users with wireless access may already have the necessary hardware to perform these tasks when purchasing systems with this capability. However, the overall goal of determining the availability of a wireless access point may likewise be accomplished by a stand-alone, possibly handheld, device. The preferred implementation of a handheld device for determining the availability of wireless access points would have a wireless communication module substantially as that shown in FIG. 2. Because the preferred handheld embodiment does not attach to a computer system, the handheld device preferably has an on-board battery, an activation switch, and some form of notification device. One having ordinary skill in the art, now understanding the implementation with respect to computer systems, could easily design a stand-alone or handheld system for determining availability of wireless access points.

The above discussion is meant to be illustrative of the principles and various embodiments of the present invention. Numerous variations and modifications will become apparent to those skilled in the art once the above disclosure is fully appreciated. For example, the wireless communication module need not communicate with the notebook computer over the universal serial bus. Any of the primary or secondary expansion buses may be operable for this function. Further, the invention should not be limited to any particular placement of the electrical switch that begins the powered-off seek mode. The button could be placed at any convenient or inconvenient location on the computer system, and this placement would still be within the contemplation of this invention. Indeed, the powered-off wireless access seek could itself be initiated wirelessly. Further, the preferred and related embodiments have described that the user is notified of the existence of a wireless access point by some form of visual communication, in the preferred embodiments a light emitting diode. However, indicating to the user that wireless access is available is not limited to these visual mechanisms, and may be done audibly, for example by sounding a particular tone, or possibly physically, such as by vibrating like modern cellular telephones and pagers. Further, the preferred embodiments have been disclosed with regard to a notebook computer system with wireless access capabilities; however, other computing devices, such as hand-held organizers and the like, may now or in the future have this wireless access capability, and the structures and methods described herein are equally applicable to those devices. Along these lines, the electrical block diagrams shown of the notebook computer and the wireless communication module are merely exemplary, and one of ordinary skill in the art, now understanding the principles of the preferred embodiments, could easily implement the structure and methods in other architectures of computing devices. It is intended that the following claims be interpreted to embrace all such variations and modifications.

What is claimed is:

1. A computer system comprising:
   a main system processor;
   a system main memory coupled to the processor;
   a radio module that scans for available wireless access points which support two-way data communications;
   a power supply coupled to the radio module and the main system processor;
   an electrical switch mounted on an external surface of the computer system; and
   a seek logic coupled to the electrical switch and the power supply;
   wherein the seek logic commands the power supply to power the radio module responsive to the actuation of the electrical switch; and
   wherein, while the computer system is powered-off, the radio module scans for available wireless access points, and indicates the availability of a wireless access point.

2. The computer system as defined in claim 1 wherein the radio module further comprises:
   a media access controller coupled to a Universal Serial Bus (USB) of the computer system, the media access controller having a digital input signal coupled to the seek logic, and wherein the media access controller scans for available wireless access points responsive to assertion of the digital input signal by the seek logic;
   a plurality of radio circuits that convert wireless communication from the computer system to radio frequency signals; and
   a signaling unit coupled to the media access controller that indicates the availability of a wireless access point.

3. The computer system as defined in claim 2 wherein the signaling unit further comprises a light emitting diode (LED) coupled to the media access controller, and wherein the media access controller lights the LED if a wireless access point is available.

4. The computer system as defined in claim 2 wherein the signaling unit further comprises a display device capable of scrolling text messages, and wherein the media access controller places text messages on the display device indicating the availability of a wireless access point.

5. The computer system as defined in claim 1 wherein the electrical switch further comprises a momentary push button switch mounted on an outer surface of a video display of the computer system.

6. The computer system as defined in claim 1 wherein, responsive to a momentary actuation of the electrical switch, the seek logic is configured to command the power supply to power the radio module for a sufficient amount of time to allow the radio module to perform a wireless access seek function, and wherein the seek logic command the radio module to perform a scan for available access points responsive to the momentary actuation of the electrical switch.

7. The computer system as defined in claim 6 wherein the seek logic further comprises:
a power supply enabled input signal, wherein the power supply enabled signal is asserted to indicated that the computer system is powered-on; and
wherein the seek logic is further configured to refrain from commanding the radio module to perform a scan for available wireless access points if the power supply enabled input signal is asserted.

8. The computer system as defined in claim 1 wherein the radio module indicates the unavailability of a wireless access point while the computer system is powered-off.

9. A computer system comprising:
a processor;
a main memory array coupled to the processor;
a radio module that scans for available wireless access points;
a power supply coupled to the radio module and the processor;
an electrical switch mounted on an external surface of the computer system; and
a seek logic coupled to the electrical switch and the power supply;
wherein the seek logic commands the power supply to power the radio module responsive to the actuation of the electrical switch, the command only when the computer is powered-off, and the command for the same amount of time that the electrical switch is activated, thus requiring the user to hold electrical switch in the actuated position during a seek period of the radio module; and
wherein, while the computer system is powered-off, the radio module scans for available wireless access points, and indicates the availability of a wireless access point.

10. The computer system as defined in claim 9 wherein the seek logic further comprises:
a power supply enabled input signal, wherein the power supply enabled input signal is asserted to indicate that the computer system is powered-on; and
wherein the seek logic is further configured to refrain from commanding the radio module to perform a scan for available wireless access points if the power supply enabled input signal is asserted.

11. A method of finding wireless access points with a computing device, the method comprising:
requesting a wireless access seek with the computing device powered-off;
scanning for available wireless access points which support two-way data communication, the scanning with a wireless communication module of the portable computing device while remaining portions of the computing device are powered-off; and
indicating the availability of wireless access points while the remaining portions of the computing device are powered-off.

12. The method as defined in claim 11 wherein requesting a wireless access seek further comprises actuating a momentary push-button.

13. The method as defined in claim 12 wherein actuating a momentary push-button further comprises pushing a button on an outer surface of the computing device.

14. The method as defined in claim 11 wherein requesting a wireless access seek further comprises:
enabling substantially only a power supply that supplies power to the wireless communication module; and
asserting a seek request signal to the wireless communication module.

15. The method as defined in claim 11 wherein scanning for available wireless access point further comprises executing software in a microcontroller of the wireless communication module, and wherein the software controls various radio components in the wireless communication module.

16. The method as defined in claim 11 wherein informing the user of the availability of wireless seek access points further comprises lighting a light emitting diode.

17. A computer comprising:
a main system processor;
a main memory array coupled to the processor;
a seek request button mounted on an outer surface of the computer;
a seek logic coupled to the seek request button;
a first power supply coupled to the seek logic, and wherein the seek logic enables substantially only the first power supply responsive to assertion of the seek request button;
a wireless communication module coupled to the seek logic and the first power supply, wherein the first power supply powers the wireless communication module and wherein the seek logic enables the wireless communication module to perform seeking for wireless access points for network data communications, and the seeking responsive to assertion of the seek request button; and
a notification device coupled to the wireless communication module, wherein the notification device indicates the unavailability of a wireless access point;
wherein the seek logic refrains from enabling the wireless communication module to perform seeking for wireless access clients if the computer is powered-on.

18. A computer system comprising:
a means for executing programs and instructions;
a means for storing programs and data coupled to the means for executing;
a means for activating a seek for a wireless access point mounted on an outer surface of the computer;
a first means for powering the means for wireless access and the means for executing;
a means for controlling the means for wireless access coupled to the means for wireless network access, the means for activating, and the means for powering;
wherein the first means for powering powers substantially only the means for wireless network access; and
wherein the means for controlling enables the means for wireless network access to perform a seek for wireless access points responsive to assertion means for activating; and a means for notification of the unavailability of a wireless access point coupled to the means for wireless communication;

wherein the means for controlling refrains from enabling the means for wireless network access to perform seeking for wireless access points if the computer system is powered-on.

19. A system comprising:

a mobile computing system in a powered-off state;

a wireless communication module which supports two-way data communication, the wireless communication module coupled to the mobile computing system; and a seek enabled button mounted on an exterior surface of one of the mobile computing device or the wireless communication module;

wherein the wireless communication module, when commanded by a user actuating the seek enable button and while the mobile computing system is powered-off, scans for availability of wireless access to a network; and wherein the wireless communication module informs the user of availability of wireless access while the mobile computing system is powered-off.

20. The system as defined in claim 19 further comprising:

a power supply coupled with the mobile computing system;

wherein the power supply, responsive to actuating the seek enable button by the user, supplies power to the wireless communication module, and refrains from powering the mobile computing system such that the mobile computing system remains powered-off.

21. The system as defined in claim 20 further comprising:

a seek logic coupled between the seek enable button and the power supply, the seek logic also coupled between the seek enable button and the wireless communication module;

wherein the seek logic, responsive to assertion of the seek enable button, command the power supply to supply power to the wireless communication module, and wherein the seek logic, responsive to assertion of the seek enable button, commands the wireless communication module to scan for availability of wireless access to a network.

22. The system as defined in claim 21 wherein the seek logic refrains from commanding the power supply and wireless communication module if the mobile computing device is powered-on.

23. A method comprising:

accepting a command from a user of a powered-off mobile computing device to perform a search for wireless network availability; and thereafter performing a search for wireless access availability which supports two-way data communication, the performing by a wireless communication module of the mobile computing device, and the performing while the mobile computing device is powered-off; and informing the user of an outcome of the performing, the informing while the computing system is powered-off.

24. The method as defined in claim 23 wherein accepting further comprises sensing the actuation of a seek enable button on an exterior surface of one of the mobile computing device or the wireless communication module.

25. The method as defined in claim 23 wherein informing further comprises lighting a light emitting diode.

26. The method as defined in claim 23 wherein informing further comprises scrolling a message across a liquid crystal display.

27. A computer system comprising:

a radio module that scans for available wireless access points that support two-way data communications;

a power supply coupled to the radio module;

an electrical switch mounted on an external surface of the computer system; and a seek logic module coupled to the electrical switch and the power supply;

wherein the seek logic commands the power supply to power the radio module responsive to the actuation of the electrical switch; and wherein the radio module scans for available wireless access-points, and indicates the availability of a wireless access point, both before an operating system of the computer system is booted.

28. The computer system as defined in claim 27 wherein the radio module indicates the unavailability of a wireless access point before an operating system of the computer system is booted.

* * * * *

UNITED STATES PATENT AND TRADEMARK OFFICE
CERTIFICATE OF CORRECTION

PATENT NO. : 7,353,416 B2
APPLICATION NO. : 09/912784
DATED : April 1, 2008
INVENTOR(S) : Jeffrey K. Jeansonne et al.

It is certified that error appears in the above-identified patent and that said Letters Patent is hereby corrected as shown below:

In column 9, line 20, delete "48. 80" and insert -- 48, 50 --, therefor.

In column 10, line 17, delete "modem" and insert -- modern --, therefor.

In column 11, line 15, in Claim 6, delete "command" and insert -- commands --, therefor.

In column 11, line 16, in Claim 6, after "available" insert -- wireless --.

In column 11, line 21, in Claim 7, after "enabled" insert -- input --.

In column 11, line 21, in Claim 7, delete "indicated" and insert -- indicate --, therefor.

In column 11, line 44, in Claim 9, after "computer" insert -- system --.

In column 12, line 11, in Claim 13, insert -- mounted --, before "on an outer".

In column 12, line 19, in Claim 15, delete "point" and insert -- points --, therefor.

In column 12, line 39, in Claim 17, after "module" insert -- , --.

In column 13, line 13, in Claim 19, delete "enabled" and insert -- enable --, therefor.

In column 13, line 14, in Claim 19, delete "device" and insert -- system --, therefor.

In column 13, line 25, in Claim 20, delete "with" and insert -- within --, therefor.

In column 13, line 27, in Claim 20, after "actuating" insert -- of --.

In column 13, line 38, in Claim 21, delete "command" and insert -- commands --, therefor.

In column 13, line 47, in Claim 22, delete "device" and insert -- system --, therefor.

In column 14, line 6, in Claim 23, delete "access" and insert -- network --, therefor.

UNITED STATES PATENT AND TRADEMARK OFFICE
CERTIFICATE OF CORRECTION

PATENT NO. : 7,353,416 B2
APPLICATION NO. : 09/912784
DATED : April 1, 2008
INVENTOR(S) : Jeffrey K. Jeansonne et al.

It is certified that error appears in the above-identified patent and that said Letters Patent is hereby corrected as shown below:

In column 14, line 7, in Claim 23, delete "communication" and insert -- communications --, therefor.

In column 14, line 12, in Claim 23, after "the" insert -- mobile --.

In column 14, line 12, in Claim 23, delete "system" and insert -- device --, therefor.

In column 14, line 32, in Claim 27, after "logic" delete "module".

In column 14, line 44, in Claim 28, delete "an" and insert -- the --, therefor.

Signed and Sealed this

Tenth Day of March, 2009

JOHN DOLL
*Acting Director of the United States Patent and Trademark Office*